US009124549B1

(12) United States Patent
Scheffler et al.

(10) Patent No.: US 9,124,549 B1
(45) **Date of Patent: *Sep. 1, 2015**

(54) AUTOMATED WEB FRONTEND SHARDING

(71) Applicant: Google Inc., Mountain View, CA (US)

(72) Inventors: Jens Scheffler, Mountain View, CA (US); Niklaus Haldimann, New York, NY (US); Adam E. Winer, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/464,759

(22) Filed: Aug. 21, 2014

Related U.S. Application Data

(63) Continuation of application No. 14/019,067, filed on Sep. 5, 2013, now Pat. No. 8,892,744, which is a continuation of application No. 13/020,966, filed on Feb. 4, 2011, now Pat. No. 8,533,336.

(51) Int. Cl.
*G06F 15/16* (2006.01)
*H04L 29/08* (2006.01)
*G06F 9/445* (2006.01)

(52) U.S. Cl.
CPC ............ *H04L 67/02* (2013.01); *G06F 9/44526* (2013.01)

(58) Field of Classification Search
CPC ........ G06F 9/44526; G06F 8/61; H04L 67/02
USPC .......... 709/226, 229, 217; 717/139, 174, 177; 718/1
See application file for complete search history.

(56) References Cited

U.S. PATENT DOCUMENTS 6,823,508 B1 * 11/2004 Burkhardt et al. ............ 717/174
7,509,638 B2 3/2009 Backhouse
8,533,336 B1 * 9/2013 Scheffler et al. .............. 709/226
8,726,247 B2 * 5/2014 Wilkinson et al. ............ 717/139
8,892,744 B1 * 11/2014 Scheffler et al. .............. 709/226
2002/0183051 A1 12/2002 Poor (Continued)

OTHER PUBLICATIONS

'ASP Application Object' w3schools.com [online] Sep. 9, 2010 [retrieved on Aug. 16, 2011] Retrieved from the Internet electronic mail: http://framework.zend.com/manual/en/zend.application.theory-of-operation.html.

'ZF Zend Framework.' Zend Framework: Documentation: Theory of Operation—Zend Framework Manual [online] [retrieved on Aug. 16, 2011] Retrieved from the Internet electronic mail: http://www.w3schools.com/ASP/asp_applications.asp.

(Continued)

*Primary Examiner* — Jungwon Chang
(74) *Attorney, Agent, or Firm* — Fish & Richardson P.C.

(57) ABSTRACT

Methods, systems, and apparatus, including computer programs encoded on a computer storage medium, for requesting handling web applications provided from a server. A bootstrap object is received from the server. The bootstrap object is independent of the requested web application and includes default settings for a plurality of different web applications. An application configuration object is also received from the server. The application configuration object is specific to the requested web application and includes a plurality of plugin handles. The bootstrap object loads the application configuration object, and identifies, based on the plugin handles, a first plugin for the requested web application. The first plugin is requested, and upon receipt the from the server the first plugin is loaded in a user interface. The first plugin exposes an application programming interface (API) of the first plugin to the bootstrap object.

27 Claims, 9 Drawing Sheets

(56) References Cited

U.S. PATENT DOCUMENTS

| | | | | |
|---|---|---|---|---|
| 2004/0111723 | A1 | 6/2004 | Moles | |
| 2008/0064383 | A1 | 3/2008 | Nath | |
| 2008/0250254 | A1 | 10/2008 | Bendapudi | |
| 2009/0064001 | A1 | 3/2009 | Robbins | |
| 2009/0187666 | A1 * | 7/2009 | Benschop et al. | 709/229 |
| 2009/0254912 | A1 | 10/2009 | Roundtree | |
| 2010/0037206 | A1 | 2/2010 | Larimore | |
| 2010/0083211 | A1 | 4/2010 | Poole | |
| 2011/0154327 | A1 * | 6/2011 | Kozat et al. | 718/1 |
| 2011/0302558 | A1 | 12/2011 | Brilliant | |

OTHER PUBLICATIONS

Office Action issued in U.S. Appl. No. 13/020,966 on Jan. 9, 2013, 16 pages.

Notice of Allowance issued in U.S. Appl. No. 13/020,966 on May 15, 2013, 6 pages.

Office Action issued in U.S. Appl. No. 14/019,067 on Jun. 4, 2014, 12 pages.

Notice of Allowance issued in U.S. Appl. No. 14/019,067 on Jul. 8, 2014, 8 pages.

* cited by examiner

AUTOMATED WEB FRONTEND SHARDING

CROSS-REFERENCE TO RELATED APPLICATION

This application is a continuation of U.S. application Ser. No. 14/019,067, filed Sep. 5, 2013, which is a continuation of U.S. application Ser. No. 13/020,966, filed Feb. 4, 2011, the contents which is incorporated by reference.

BACKGROUND

This specification describes technologies relating to web applications.

Often multiple web applications created by a single developer have similar features. The developer can create the web applications so that the web applications have a similar design, e.g., cascading style sheets (CSS), page layout, and/or navigation. Similarly, some of the web applications can share common functionality, e.g., billing or user management functionality. Often the common features are realized by use of the same code base for each feature.

When multiple web applications are created independently, e.g., at different times, some of the code used to implement similar features may be replicated between the web applications. Sometimes, however, revisions to code for one of the web applications will not be duplicated to another web application that included the same code before the revisions were made. The difference in revisions to the code can cause the web applications to appear or act differently when the web applications were intended to appear and/or act in a similar manner.

SUMMARY

In general, one innovative aspect of the subject matter described in this specification can be embodied in methods that include the actions of requesting a web application from a server; receiving, in response to the web application request, a bootstrap object from the server, wherein the bootstrap object is independent of the requested web application and includes one or more default settings for the requested web application, the default settings being default settings for a plurality of different web applications; initializing the requested web application in a user interface according to the default settings; receiving, in response to the web application request, an application configuration object from the server, wherein the application configuration object is specific to the requested web application and includes a plurality of plugin handles; loading, by the bootstrap object, the application configuration object; identifying, based on the plugin handles, a first plugin associated with the requested web application; requesting the first plugin from the server; receiving the first plugin from the server in response to the request for the first plugin; and loading the first plugin in the user interface, wherein loading the first plugin exposes an application programming interface (API) of the first plugin to the bootstrap object. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Change to a code base can be propagated consistently across multiple clients, resulting in commonality of performance and appearance. Additionally, software fixes and patches can be propagated consistently across multiple clients.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

1.0 Overview

This specification describes technologies relating to web application plugins that can be used by multiple web applications. When a client device requests a web application from a server hosting the web application, the server provides the client device with a bootstrap object and an application configuration object. As used herein, an object is code that can be executed on a device, such as a JavaScript file or code snippet.

The bootstrap object includes default settings for web applications provided by the server, such as a default layout of the web applications. For example, the bootstrap object can have handles or pointers that identify plugins to load for the default options of the web applications, such as a sidebar plugin. As used herein, a plugin is a self-contained file, such as a script file (e.g., JavaScript), that exposes an application programming interface (API) to the bootstrap object when loaded, and a plugin handle is a reference indicating where to find an associated plugin on the server. The bootstrap object can include default settings that indicate a default navigation, sidebar, and cascading style sheets (CSS) used by the web applications.

The application configuration object is associated with and specific to the requested web application and includes a plurality of plugin handles for plugins that customize the requested web application. For example, the application configuration object can include plugin handles for a user management plugin and a billing plugin that provide functionality to the requested web application that other different web applications provided by the server do not have.

The bootstrap object initializes the requested web application in a user interface using the default settings specified in the bootstrap object and requests plugins from the server. The requested plugins can include default plugins (e.g., identified in the bootstrap object) and/or application specific plugins (e.g., identified in the application configuration object). The server provides the requested plugins to the bootstrap object and the bootstrap object loads the plugins into the requested web application. For example, when the bootstrap object loads the user management plugin in the user interface, controls are displayed in the user interface which provide a user with user management options (e.g., buttons, menus, etc.).

In some implementations, using a single plugin across multiple similar web applications reduces the amount of code used by the developer and the amount of time needed to maintain the code. In some implementations, using a single plugin across multiple similar web applications reduces the chance that changes to code might break a web application that uses the plugin.

1.1 Example Environment

Figure 1A:
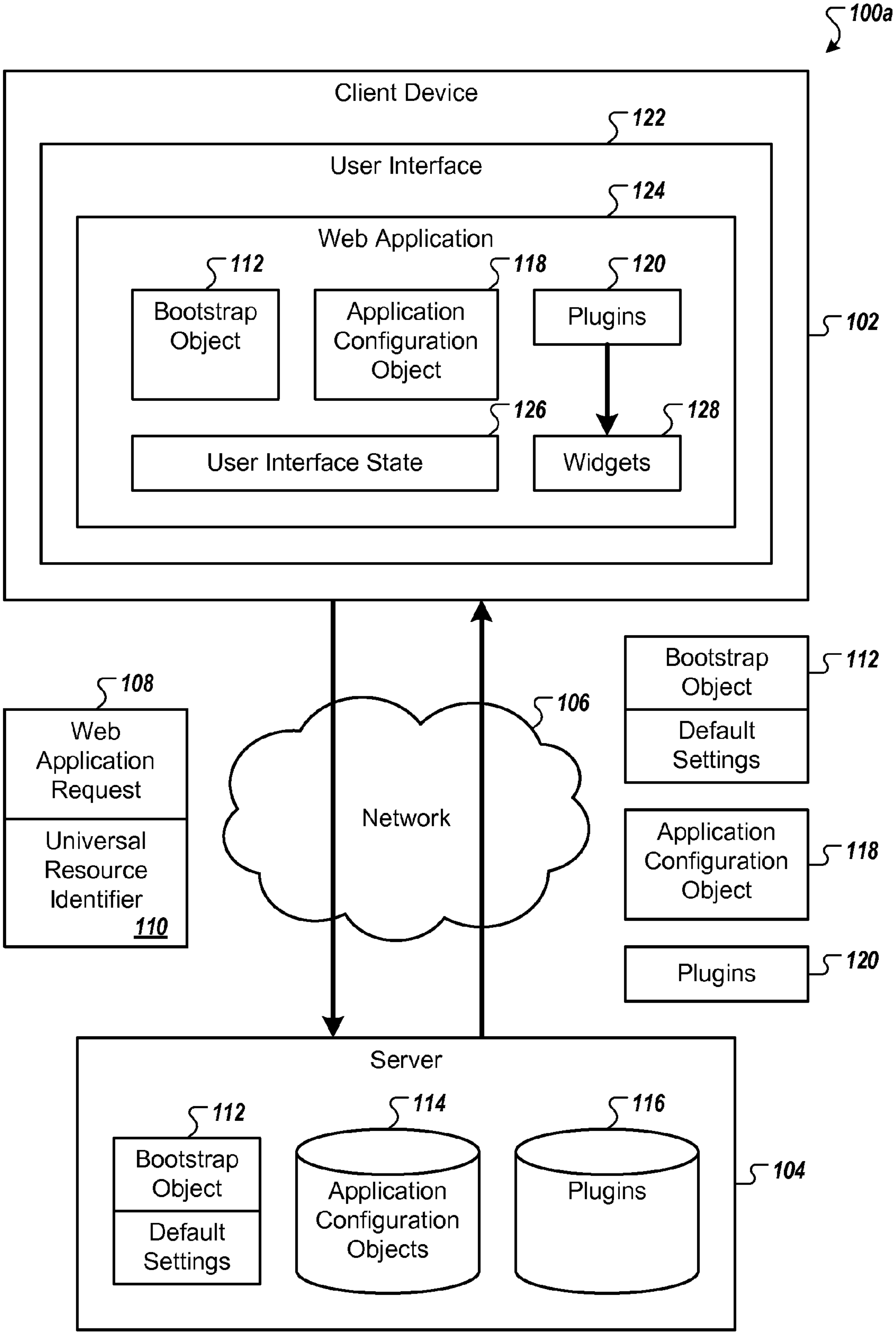
FIG. 1A is a block diagram of an example environment in which a client device requests a web application from a server.

FIG. 1A is a block diagram of an example environment 100*a* in which a client device 102 requests a web application from a server 104. A computer network 106, such as a local area network (LAN), wide area network (WAN), the Internet, or a combination thereof, connects the client device 102 and the server 104. The environment 100*a* may include many thousands of client devices 102 and servers 104.

A client device 102 is an electronic device that is under the control of a user and is capable of requesting and receiving resources over the network 106. Example client devices 102 include personal computers, mobile communication devices, and other devices that can send and receive data over the network 106. A client device 102 typically includes a user application, such as a web browser, to facilitate the sending and receiving of data over the network 106. The web browser can enable a user to display and interact with text, images, videos, music, documents, web applications, and other information typically located on a web page at a website on the World Wide Web or a local area network.

The client device 102 sends a web application request 108 to the server 104. The web application request 108 includes an identifier that indicates the web application requested by the client device 102. In some implementations, the web application request 108 includes a universal resource identifier (URI) 110 that is associated with the requested web application. For example, a web browser on the client device 102 requests a web page from the server 104 using a universal resource locator (URL) and receives a hypertext markup language (HTML) file from the server. The HTML file includes a script (e.g., JavaScript) that sends the web application request 108 to the server 104 for the specific web application associated with the requested URL.

The server 104 receives the web application request 108 from the client device 102 and identifies a web application associated with the web application request 108. For example, the server 104 hosts a plurality of different web applications created by a developer and identifies a human resource management application based on the URI 110 in the web application request 108.

The server 104 includes a bootstrap object 112 that is independent of the requested web application. The bootstrap object includes one or more default settings for the requested web application and is used on the client device 102 to initialize the requested web application. The default settings are default settings for the plurality of different web applications hosted by the server 104. For example, the bootstrap object 112 is independent of the human resource management application and all other web applications created by the developer (i.e., the same bootstrap object 112 is sent in response to any web application request, and this is not dependent on a particular web application request).

The server 104 includes a plurality of application configuration objects 114 where each application configuration object is associated with a specific web application hosted by the server 104 and includes a plurality of plugin handles. The bootstrap object 112 can use the plugin handles to identify plugins associated with the requested web application where the plugins are used to customize the web application. For example, the plugin handles can be used to identify a user management plugin associated with the human resource management application.

The server 104 includes a plurality of plugins 116 that are used to generate widgets for the requested web application. Widgets are based on the current user interface state of the requested web application and are a control feature associated with the respective plugin. For example, depending on a document selected (e.g., the current user interface state) the plugins generate widgets (e.g., buttons, menus, etc.) for the human resource management application and give the requested web application different functionality from the other web applications. The plugins and associated widgets provide the different web applications the functionality that makes the different web applications distinct while allowing the use of plugins by multiple web applications when the different web applications have some similar functionality.

In response to receiving the web application request 108, the server 104 identifies an application configuration object 118 that is associated with the requested web application and provides the application configuration object 118 and a copy of the bootstrap object 112 to the client device 102. For example, the server 104 includes a mapping of URIs to the application configuration objects 114 and identifies the application configuration object 118 using the URI 110.

2.0 the Bootstrap Object and Application Configuration Object

In general, the bootstrap object 112 provides a common framework to display and assemble web applications on the client. The bootstrap object 112 can accept customization from the application configuration object 114, handle navigation between the plugins, provide common data entities and services, and manage data that is common between applications.

The application configuration object 114 is an object that the bootstrap object 112 accesses to customize the basic application setup according to the selected web application. In some implementations, the application configuration objects each comply with a common interface, e.g.:

```
ApplicationConfig {
getApplicationName( ): String
getApplicationBackgroundColor( ): String
getMenu(DocumentDescriptor): Pair<MenuLabel, PluginHandle>[ ]
getInitialPlugin(DocumentDescriptor): PluginHandle
}
```

The bootstrap object 112 and application configuration objects 114 are described in more detail below.

In response to receiving the bootstrap object 112, the client device 102 initializes the requested web application 124 in a user interface 122 using the bootstrap object 112. For example, the bootstrap object 112 is loaded into the web browser that sent the web application request 108 and the bootstrap object 112 initializes the requested web application 124 in the user interface 122 of the web browser using the default settings associated with the bootstrap object 112. In some implementations, the bootstrap object 112 initializes the requested web application 124 with a default page layout and sidebar menu.

The bootstrap object 112 identifies one or more plugins 120 associated with the requested web application 124 based on the plugin handles specified in the application configuration object 118 and requests the plugins from the server 104. For example, the bootstrap object 112 identifies a plugin for the sidebar menu based on a plugin handle specified in the application configuration object 118.

The server 104 receives the plugin requests, identifies the requested plugins in the database of plugins 116, and provides the plugins 120 to the client device 102. The bootstrap object 112 receives the plugins 120 and loads the plugins 120 in the requested web application 124. When each of the plugins 120 is loaded in the requested web application 124, an API associated with the respective plugin is exposed to the bootstrap object 112 which allows the bootstrap object 112 to call methods associated with the plugin and receive an indication when controls associated with the plugin are selected by a user.

In some implementations, when the bootstrap object 112 receives a plugin (e.g., one of the plugins 120) the bootstrap object 112 activates the plugin. The bootstrap object 112 can provide the plugin with a user interface state 126 of the requested web application during activation, as described in more detail with reference to FIG. 1C below. The user interface state 126 is the same for all of the plugins 120 and includes settings associated with the web application, such as the name of the requested web application 124, the currently selected plugin, a currently selected document, and a handle to the sidebar menu, to name a few examples.

During activation, the plugin generates a widget that is associated with the plugin and the bootstrap object 112 loads the widget in the requested web application 124. For example, the plugins 120 are activated and, during activation, generate one or more widgets 128 associated with the respective plugins. The plugins 120 can use the user interface state 126 to determine what widgets 128 should be displayed in the user interface 122. The widgets 128 customize the functionality and/or appearance of the requested web application 124 differentiating the requested web application 124 from different applications provided by the server 104.

2.1 Example Implementation

The Bootstrap Object

Figure 1B:
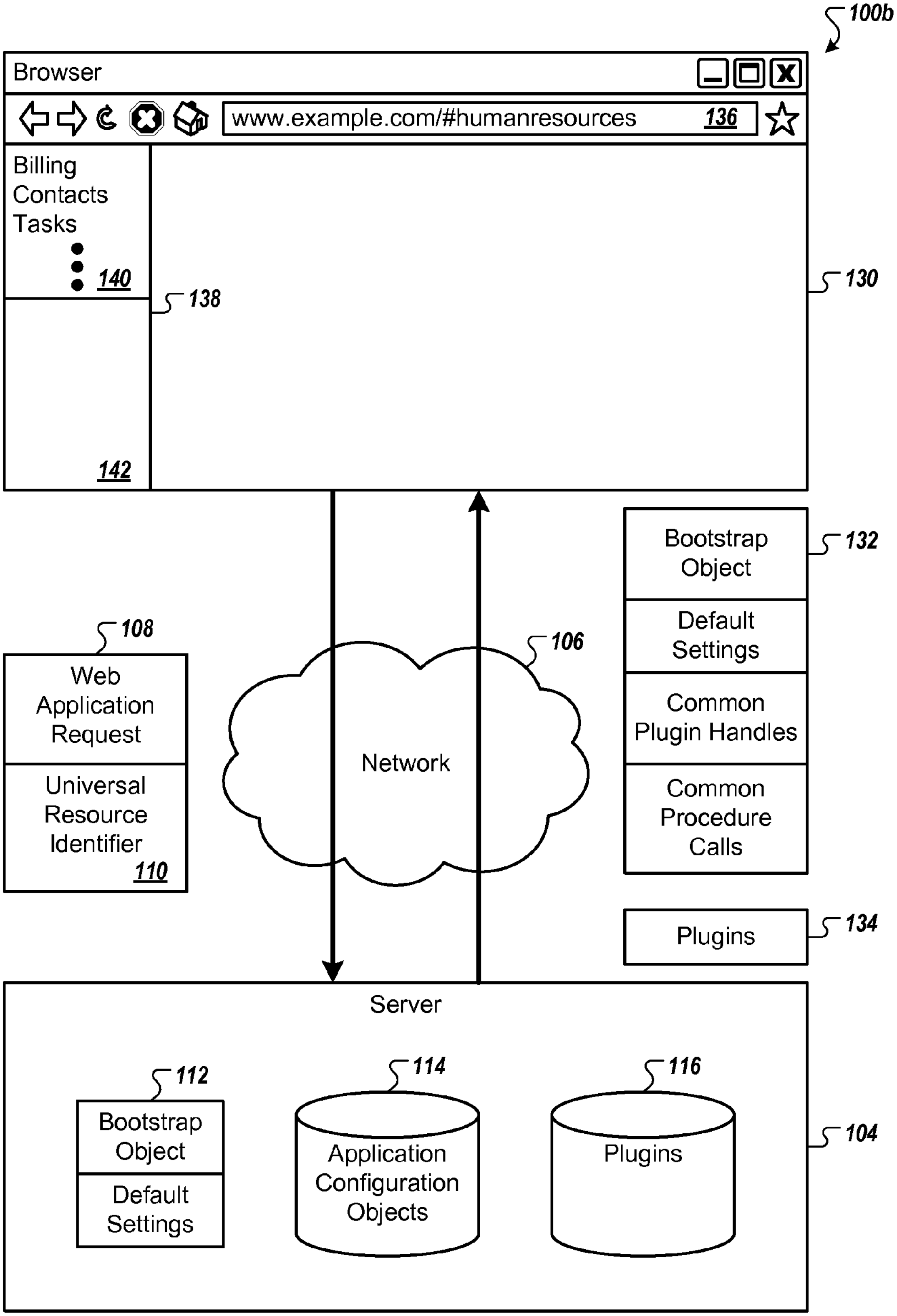
FIG. 1B is a block diagram of an example environment in which a web browser receives a bootstrap object from a server.

FIG. 1B is a block diagram of an example environment 100*b* in which a web browser 130 receives a bootstrap object 132 from the server 104. The web browser 130 requests a web application from the server 104 and includes the URI 110 in the web application request 108. For example, the web browser 130 receives a URL address "www.example.com/" and an anchor "#humanresources" in an address bar 136 as a web application request from a user and uses "www.example.com/" as the URI 110 of the web application request 108.

In response to the web application request 108, the server 104 provides the bootstrap object 132 to the web browser 130. The bootstrap object 132 includes one or more default settings for the requested web application, where the default settings are default settings for a plurality of different web applications. For example, the default settings identify a common page layout and a sidebar menu 138 (e.g., the location and size of the sidebar menu 138) for web applications provided by the server 104.

The web browser 130 receives and loads the bootstrap object 132 and the bootstrap object 132 initializes the requested web application in the user interface of the web browser 130. For example, the bootstrap object 132 initializes the human resource management application according to a CSS style indicated in the default settings with the sidebar menu 138 on the left of the user interface.

The bootstrap object 132 includes one or more common plugin handles and one or more common procedure calls for use in two or more web applications. The bootstrap object 132 can use the plugin handles to identify one or more plugins 134 to request from the server. For example, the bootstrap object 132 can identify and request a sidebar plugin associated with a sidebar menu from the server 104. The common procedure calls can be used to load plugins and to make remote procedure calls (e.g., to request plugins form the server 104).

The bootstrap object 132 can activate the sidebar plugin by calling an activate method associated with the sidebar plugin and provide the sidebar plugin with a current state of the requested web application. The sidebar plugin can generate a sidebar widget that is associated with the sidebar plugin and the bootstrap object 132 can load the sidebar widget in the user interface (e.g., the sidebar menu 138). The sidebar widget can allow the bootstrap object 132 to identify user interaction with options in the sidebar menu 138 and call the appropriate methods based on the user interaction (e.g., activating a link in the sidebar menu 138). Additional widgets can include buttons, menus, text boxes, check boxes, and labels, to name a few examples.

In some implementations, the bootstrap object 132 initializes the sidebar menu 138 with one or more default links common to the web applications provided by the server 104. For example, the sidebar menu 138 can include an upper menu 140 and a lower menu 142. The bootstrap object 132 can initialize the upper menu 140 with a "billing" link, a "contacts" link, and a "tasks" link that are used by all of the web applications provided by the server 104. In some implementations, each of the links in the sidebar menu 138 is a widget associated with a plugin requested by the bootstrap object 132.

In some implementations, the default settings associated with the bootstrap object 132 indicate a default plugin or associated widget that is selected when the requested web application is initialized. For example, the default plugin can receive commands from a keyboard associated with the client device if another plugin is not selected by a user of the requested web application.

2.2 Example Implementation

Application Configuration Objects

Figure 1C:
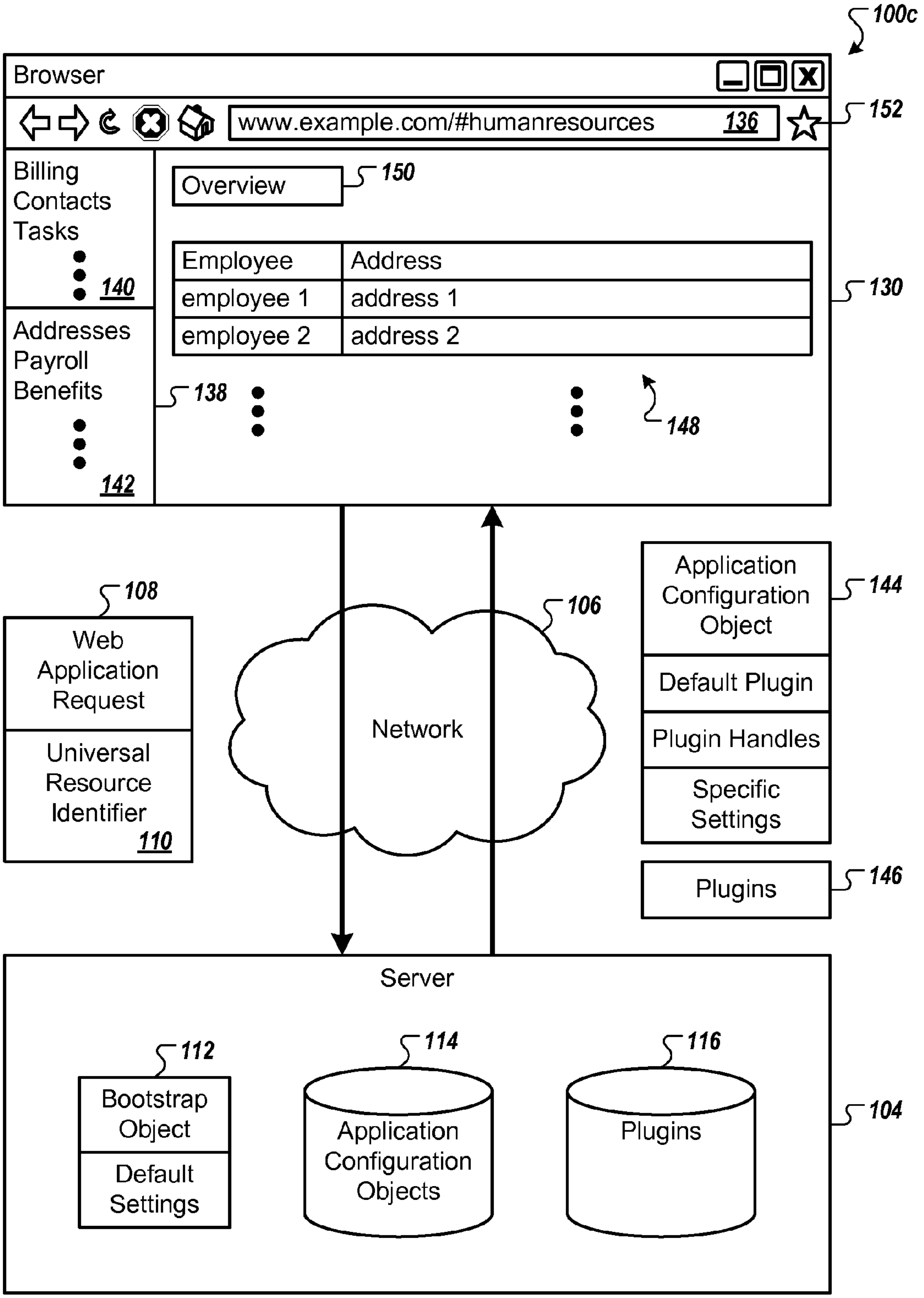
FIG. 1C is a block diagram of an example environment in which a web browser receives an application configuration object from a server.

FIG. 1C is a block diagram of an example environment 100*c* in which the web browser 130 receives an application configuration object 144 from the server 104. The application configuration object 144 indicates a default plugin to load and includes a plurality of plugin handles and settings specific to the requested web application (e.g., a window title).

The bootstrap object uses the plugin handles specified in the application configuration object 144 to customize the user interface of the requested web application. For example, when the bootstrap object initializes the requested web application, any code that is loaded into the web browser 130 is not specific to the requested web application. The bootstrap object uses the plugin handles included in the application configuration object 144 to load code specific to the requested web application into the web browser 130, such as an "addresses" link, a "payroll" link, and a "benefits" link in the lower menu 142.

The bootstrap object identifies one or more plugins 146 associated with the requested web application to request from the server 104 based on the plugin handles included in the application configuration object 144. For example, the bootstrap object identifies the default plugin associated with the requested human resource management web application.

The bootstrap object requests one of the identified plugins from the server 104 and receives the requested plugin from the server 104 in response to the request. For example, the bootstrap object determines that a user management plugin is the default plugin for the human resource management web application and requests the user management plugin from the server 104.

The bootstrap object activates the requested plugin and provides a portion of the user interface state of the requested web application to the plugin during activation. For example, the user management plugin determines that an employee information document 148 is presented in the web browser 130 and generates a widget in an overview menu 150 according to the employee information document 148. Alternatively, the user management plugin can generate a widget for the overview menu 150 dynamically when the overview menu 150 is selected by a user.

When the widget is generated, the widget is provided to the bootstrap object and the bootstrap object loads the widget in the web browser 130. For example, code associated with the widget is loaded in the web browser 130 and the widget is not presented until the corresponding menu in the overview menu 150 is selected.

The requested plugin can use the user interface state to dynamically generate widgets for presentation in the overview menu 150 and/or the user interface of the web browser 130. For example, options in the overview menu 150 can be based on a document presented in the user interface, information associated with a specific employee that is selected, and/or a currently selected plugin.

For example, the overview menu 150 associated with an application configuration object can include the following map:

Overview=><Application specific plugin 1>
"User Management"=><Common plugin>
"Billing"=><Common billing plugin>
History=><Application specific plugin 2> where the application configuration object includes plugin handles for each of the plugins in the menu and includes settings indicating the layout of the menu.

2.3 Optional Implementation Features

In some implementations, the bootstrap object checks a local cache on the client device 102 before requesting a plugin from the server 104. For example, if a plugin used by multiple web applications was previously requested in association with generation of another web application, the bootstrap object can determine that the plugin is stored locally and does not need to be requested from the server 104, provided the plugin has not expired.

In some implementations, the bootstrap object requests a plugin identified by a plugin handle in the application configuration object 144 only when the plugin is needed by the requested web application. For example, the bootstrap object does not request the plugin when a web application is being generated but instead requests the plugin when a widget associated with the plugin is needed for presentation in the web application.

In some implementations, the server 104 sends default plugins with the bootstrap object when providing the bootstrap object to the client device 102. For example, the server 104 sends the sidebar menu plugin with the bootstrap object to the web browser 130 in response to the web application request 108.

In some implementations, each on the plugins 116 does not have dependencies to any of the other plugins 116 and is functional in isolation. In some implementations, one or more of the plugins 116 are used for only a single web application hosted by the server 104. In some implementations, some of the plugins 116 are shared among a plurality of web applications hosted on the server 104.

The bootstrap object can use the user interface state 126 to share data between plugins and/or between web applications. For example, the user interface state 126 can include metadata associated with a document and the metadata can be used by multiple plugins loaded in the web application.

In some implementations, one or more widgets are generated based on the user interface state of the requested web application. For example, if the user interface state indicates that a specific employee is selected in the human resources management application, the widget can include information about the specific employee instead of general information about a number of employees.

In some implementations, one or more plugins do not use the user interface state of the requested web application during generation of a widget. For example, the requested web application can include specific controls (e.g., a logout button) that are always presented in the requested web application.

In some implementations, an anchor is associated with a plugin and the associated plugin is specified by one of the plugin handles included in the application configuration object 144. For example, the bootstrap object can identify the plugin associated with the anchor "#humanresources" and request the plugin from the server 104.

In some implementations, a bookmark in the web browser 130 for a plugin can be created based on an anchor associated with the plugin as described in more detail with reference to FIG. 6 below. For example, the web browser 130 can create a bookmark for "www.example.com/#humanresources" where the anchor "#humanresources" is associated with a human resources plugin stored in the plugins 116. A bookmark icon 152 can be used by the web browser 130 to indicate that a link to a specific plugin has been bookmarked.

In some implementations, the requested web application can be associated with multiple application configuration objects as described in more detail with reference to FIG. 5 below. For example, the requested web application can have a general configuration for users, an advanced configuration for trusted testers, and a developer configuration.

The different application configuration objects associated with the requested web application can include different plugins for different functionality associated with the requested web application. For example, the bootstrap object can identify permissions associated with the client device 102 or the web browser 130 and select an application configuration object based on the permissions.

In some implementations, multiple levels of permissions and associated application configuration objects allow developers to implement new plugins while preventing the release of the new plugins to general users. Similarly, when the new plugins have reached a certain stage of development, trusted testers or another group of users can be provided the new plugins based on an application configuration object associated with the group and permissions of the group.

In some implementations, multiple application configuration objects associated with a web application reduces the chance of code being released to general users before the code is ready. In some implementations, multiple application configuration objects allows plugins and associated code to be released to a select group of users for testing or other purposes.

In some implementations, a single application configuration object can be provided to the client device 102 where the application configuration object includes multiple levels of permissions for different types of users.

In some implementations, the server 104 verifies the permission settings of a client device 102 or a web browser 130 before providing plugins to the client device 102. For example, if the server 104 receives a request for a plugin that is only available to developers, the server 104 verifies that the client device 102 is authorized as a developer device before sending the requested plugin to the client device 102. In another example, when the server 104 receives a request for a plugin available to general users, the server 104 provides the plugin to the requesting client device without verifying the permissions of the client device because the plugin is available to everyone.

In some implementations, the multiple web applications provided by the server 104 are created by the same developer. For example, the web applications are provided by a company that offers software as a service.

In some implementations, the multiple web applications provided by the server 104 are created by different developers. For example, the server 104 is used to provide the plugins 116 to multiple developers in the creation of applications in order to reduce code maintenance across the server 104.

3.0 Example Process Flows

Figure 2:
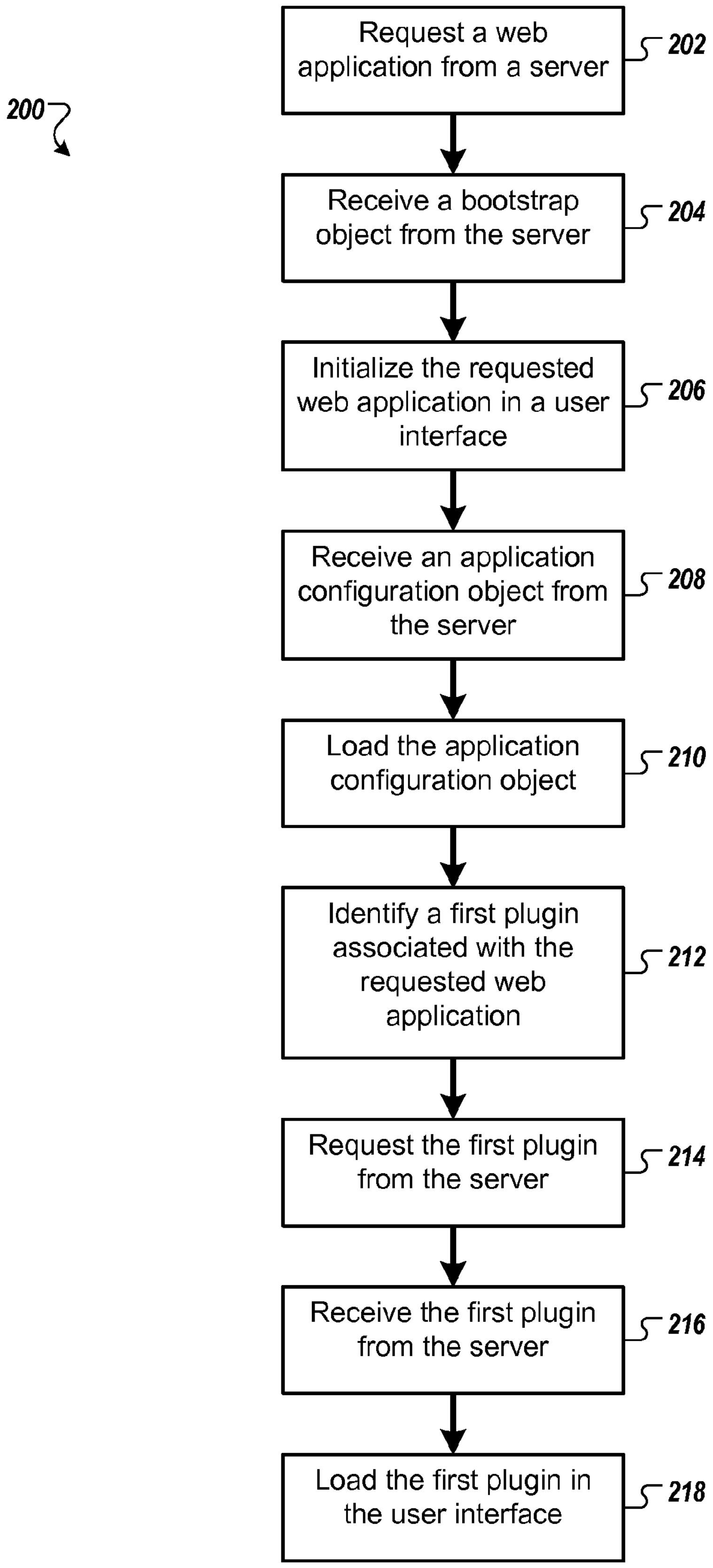
FIG. 2 is a flow diagram of a process for loading a plugin in a user interface.

FIG. 2 is a flow diagram of a process 200 for loading a plugin in a user interface. The process 200 can be used by the client device 102 to initialize the web application 124 in the user interface 122 of a web browser.

The web browser requests a web application from a server (202). For example, the web browser receives a URL address in an address bar and requests a human resource management web application from the server. Examples of different web applications can include invoicing web applications, document management web applications, collaboration web applications and other web applications.

In response to the web application request, the web browser receives a bootstrap object from the server (204). The bootstrap object is independent of the requested web application and includes one or more default settings for the requested web application. The default settings are default settings for a plurality of different web applications hosted on the server. For example, the default settings include a default layout and navigation for the human resource management web application.

The bootstrap object initializes the requested web application in a user interface (206) according to the default settings associated with the bootstrap object. For example, the bootstrap object initializes the human resource management web application in the user interface of the web browser.

In response to the web application request, the web browser receives an application configuration object from the server (208). The application configuration object is specific to the requested web application and includes a plurality of plugin handles. For example, the web browser receives an application configuration object for the human resource management web application.

The bootstrap object loads the application configuration object (210). For example, the bootstrap object loads the application configuration object in order to identify settings specific to the human resource management web application and plugins associated with the human resource management web application.

The bootstrap object identifies a first plugin associated with the requested web application (212). For example, the application configuration object indicates a default plugin and the bootstrap object identifies the default plugin.

The bootstrap object requests the first plugin from the server (214). For example, the bootstrap object requests the default plugin from the server.

In response to the request for the first plugin, the bootstrap object receives the first plugin from the server (216). For example, the bootstrap object receives the default plugin associated the human resource management web application from the server.

The bootstrap object loads the first plugin in the user interface (218). When the first plugin is loaded in the user interface, an API of the first plugin is exposed to the bootstrap object. For example, the API allows the bootstrap object to detect user interaction with the first plugin and call methods associated with the first plugin.

The order of steps in the process 200 described above is illustrative only, and processing of query suggestion requests can be done in different orders. For example, while the process 200 above describes receiving the bootstrap object and then receiving the application configuration object, the process 200 can be modified so that the process 200 receives the application configuration object and then receives the bootstrap object. Alternatively, the process 200 can be modified so that the process 200 receives the bootstrap object and the application configuration object at the same time.

In some implementations, the process 200 can include additional steps or some of the steps of the process 200 can be divided into multiple steps, as described above with reference to FIGS. 1A-C. For example, the process 200 can identify an anchor in the web application request and a plugin associated with the anchor. Additionally, the bootstrap object can request the plugin associated with the anchor (214) (e.g., the first plugin is identified based on an association between the first plugin and the anchor).

Figure 3:
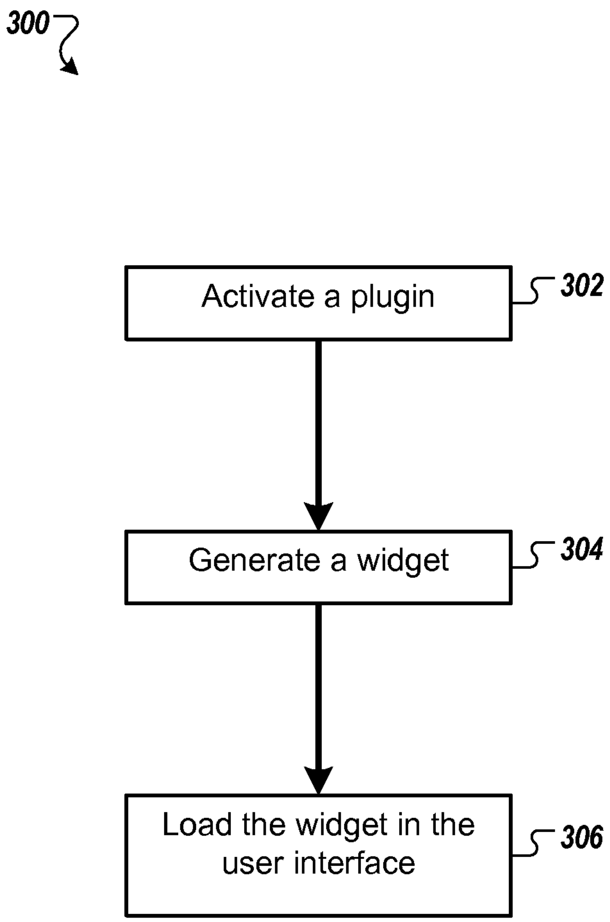
FIG. 3 is a flow diagram of a process for loading a widget in a user interface.

FIG. 3 is a flow diagram of a process 300 for loading a widget in a user interface. The process 300 can be implemented in the bootstrap object 112 to activate one of the plugins 120 and generate an associated one of the widgets 128. The process 300 can be performed as a part of the process 200 or as a separate process. For example, a client device performing the process 200 can perform the process 300 instead of step 218. The process 300 can be applied to multiple plugins.

The bootstrap object activates a plugin (302). Continuing with the example above, as part of the activation process the bootstrap object provides the first plugin with a state of the requested web application. The bootstrap object passes to the first plugin the state of the human resource management web application as an argument to an activate method of the first plugin.

The plugin generates a widget (304). The widget is based on the current state of the requested web application and the widget is a control feature associated with the plugin. For example, as described above, the first plugin can be a user management plugin and the widget can be a navigation menu of options based on the employee or document currently selected in the human resource management web application. Depending on the currently selected employee or document, the navigation menu can present different options specific to the currently selected employee or document.

The bootstrap object loads the widget in the user interface (306). For example, the bootstrap object loads the navigation menu in the user interface of the web browser.

Figure 4:
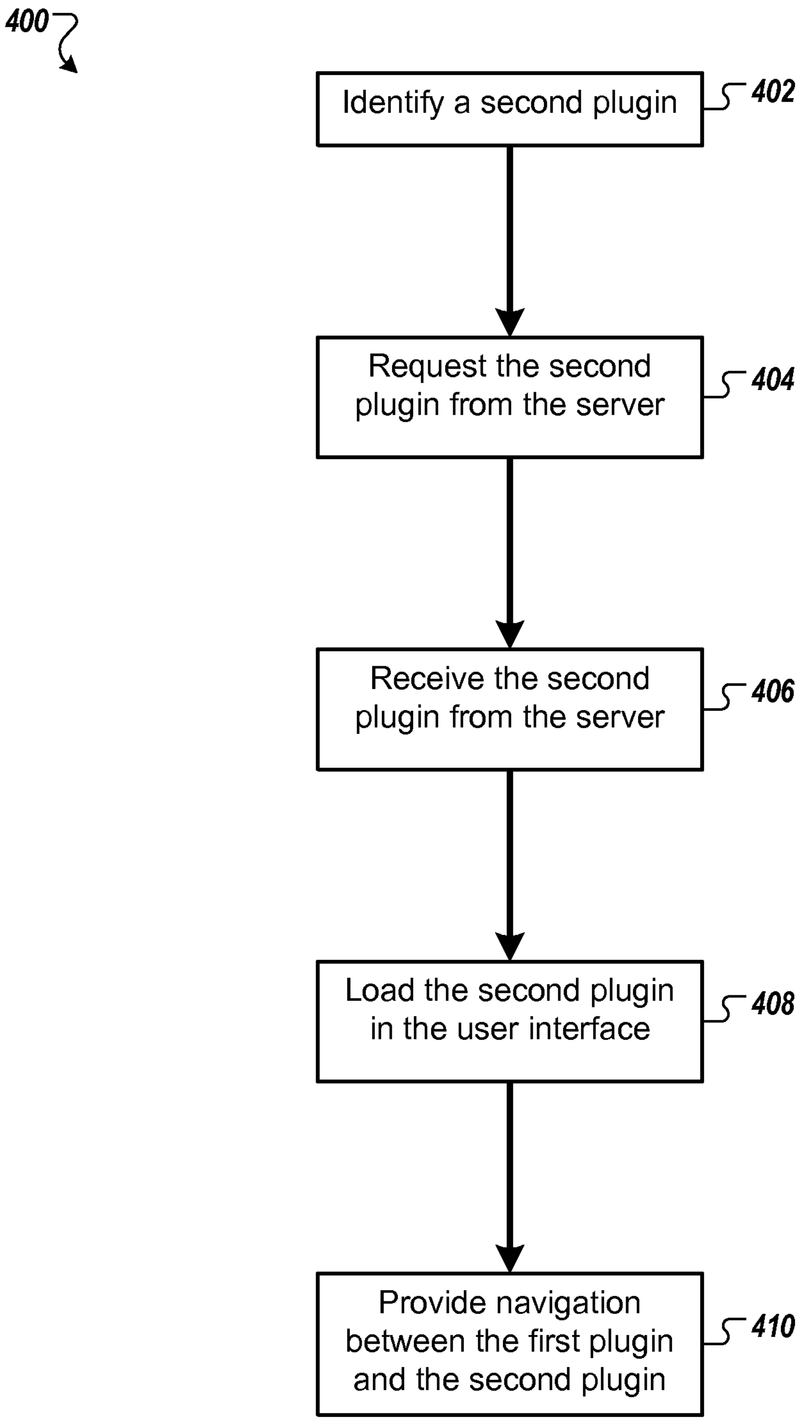
FIG. 4 is a flow diagram of a process for providing navigation between multiple plugins.

FIG. 4 is a flow diagram of a process 400 for providing navigation between multiple plugins. The process 400 can be implemented in the bootstrap object 112 to pass data between the plugins 120, e.g., a first plugin and a second plugin. In some implementations, the bootstrap object 112 can perform the process 400 after performing the process 200. When the process 400 starts, the first plugin is currently selected in the user interface of the web browser.

The bootstrap object identifies a second plugin (402). The identification is based on the plugin handles in the application configuration file for the requested web application where the second plugin is associated with the requested web application. For example, the bootstrap object identifies a billing plugin to request from the server.

The bootstrap object requests the second plugin from the server (404). For example, the bootstrap object requests the billing plugin from the server. Alternatively, the bootstrap object can check a local cache on the client device to see if a copy of the billing plugin is stored in the cache. If the billing plugin is not stored in the local cache, the bootstrap object requests the billing plugin from the server.

In response to the request for the second plugin, the bootstrap object receives the second plugin from the server (406). For example, the bootstrap object receives the second plugin from the server. Alternatively, if the billing plugin was identified in the local cache on the client device (404), the bootstrap object retrieves the billing plugin from the local cache.

The bootstrap object loads the second plugin in the user interface (408). When the second plugin is loaded in the user interface, an API of the second plugin is exposed to the bootstrap object. For example, the bootstrap object can perform the process 300 in order to load the second plugin in the user interface.

The bootstrap object provides navigation between the first plugin and the second plugin (410). The bootstrap object can determine that the second plugin has been selected by a user and pass a user interface state of the requested web application between the first plugin and the second plugin. For example, when the second plugin is selected, the bootstrap object can update the user interface state to indicate that the second plugin is currently selected and not the first plugin. The second plugin can use the user interface state to generate a widget to display in the user interface. For example, when the user selects a navigation menu, the options in the menu can be generated on the fly according to the user interface state (e.g., a currently selected document, contact, etc.).

In some implementations, the process 400 can include additional steps or some of the steps of the process 200 can be divided into multiple steps, as described above with reference to FIGS. 1A-C and 3. For example, the process 400 can identify, request, receive, and load multiple plugins in addition to the first and second plugins and provide navigation between all of the plugins loaded in the user interface.

Figure 5A:
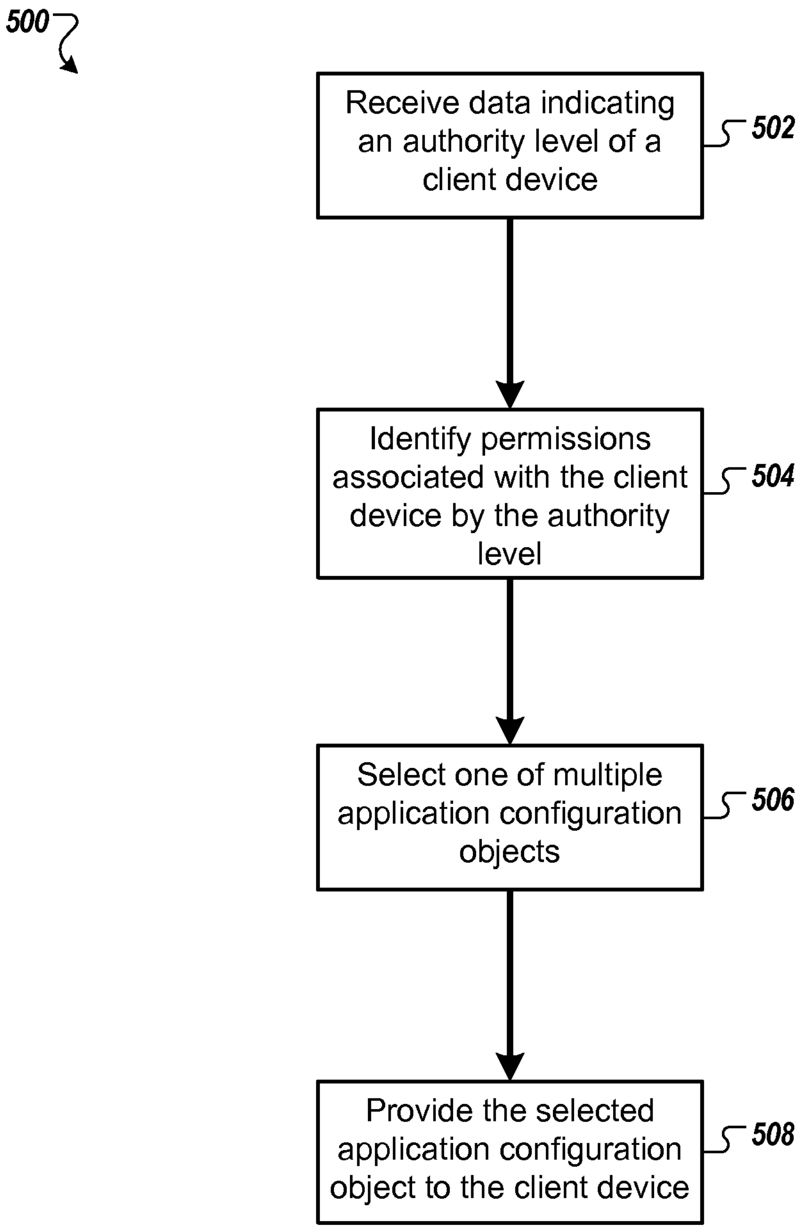
FIGS. 5A and 5B are flow diagrams of processes for loading an application configuration object.
Figure 5B:
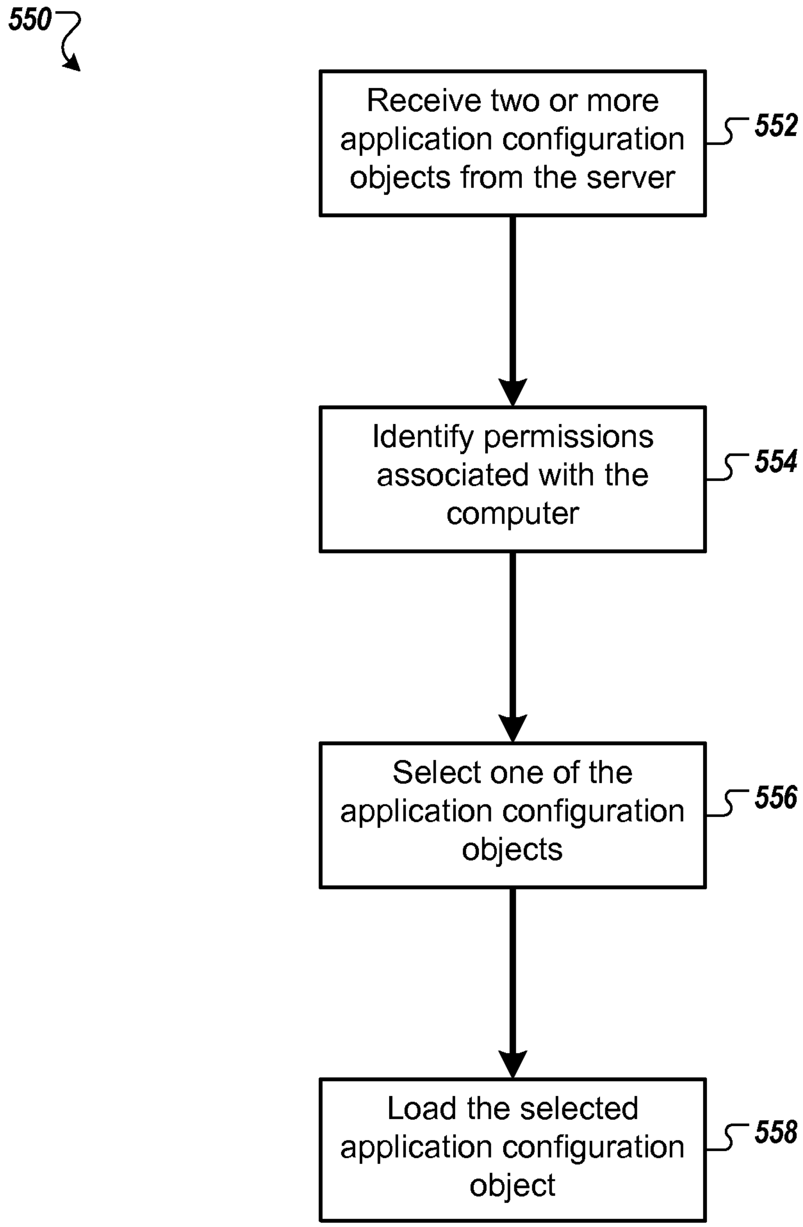

FIGS. 5A and 5B are flow diagrams of processes 500 and 550 for loading an application configuration object. The process 500 is executed on the server side, and the process 550 is an alternate process to 500 that is executed on the client side.

FIG. 5A is a flow diagram of a process 500 for loading an application configuration object. The process 500 can be implemented in a server to select an application configuration that is available to the client device 102 for the requested web application.

The server receives data indicating a client status (502). For example, the server can receive from a client device data indicating an authority level (e.g., a user level or employee category) associated with an instance of a web application running on the client device.

The server identifies permissions associated with the computer by the authority level (504). The permissions specify the application configuration objects available to the requested web application running on the client device. For example, the permissions can indicate whether the client device or the web browser is associated with a general user or a developer. For example, the server determines that the client device is associated with a general user.

Based on the permissions, the server selects one of multiple application configuration objects (506). For example, the permissions can include a general configuration, an advanced configuration, and a developer configuration, and each permission is associated with one corresponding application configuration object. The server identifies the permissions associated with a user of the client device and selects one of a general configuration object, an advance configuration object, or a developer configuration object corresponding to the identified permissions. For example, the bootstrap object selects the general configuration object.

The server provides the selected application configuration object to the client device (508). For example, the server provides the general configuration object to the client device, and the bootstrap object loads the general configuration object and customizes the requested web application according to the plugin handles in the general configuration object.

FIG. 5B is a flow diagram of a process 550 for loading an application configuration object. The process 550 can be implemented in the bootstrap object 112 on the client side to select an application configuration that is available to the client device 102 for the requested web application.

The bootstrap object receives two or more application configuration objects from the server (552). For example, the bootstrap object can receive two or more application configuration objects in separate files or in a single file from the server.

The bootstrap object identifies permissions associated with the computer (554). The permissions specify the application configuration objects available to the requested web application running on the computer. For example, the permissions can indicate whether the client device or the web browser is associated with a general user or a developer. For example, the bootstrap object can determine that the client device is associated with a general user.

Based on the permissions, the bootstrap object selects one of the application configuration objects (556). For example, the permissions can include a general configuration, an advanced configuration, and a developer configuration. The bootstrap object identifies the permissions associated with a user of the client device and selects a general configuration object, an advance configuration object, or a developer configuration object corresponding to the identified permissions. For example, the bootstrap object selects the general configuration object.

The bootstrap object loads the selected application configuration object (558). For example, the bootstrap object loads the general configuration object and customizes the requested web application according to the plugin handles in the general configuration object.

Figure 6:
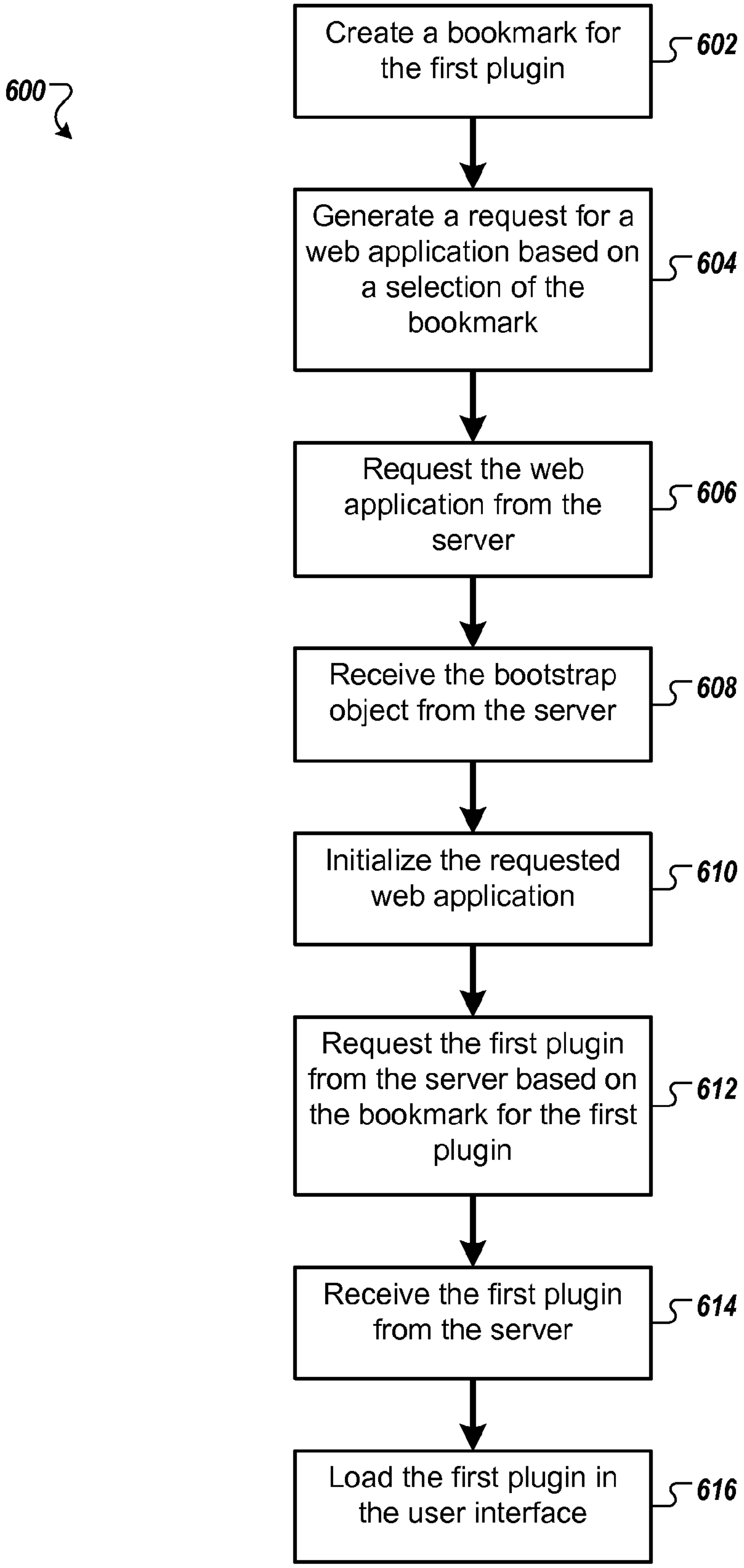
FIG. 6 is a flow diagram of a process for loading a plugin based on a bookmark associated with the plugin.

FIG. 6 is a flow diagram of a process 600 for loading a plugin based on a bookmark associated with the plugin. The process 600 can be performed by the client device 102 to request a web application from the server 104 and load a specific plugin desired by a user. In some implementations, the client device 102 can perform the process 600 after performing the process 200.

The web browser creates a bookmark for the first plugin (602). For example, the web browser detects user input indicating a request to create a bookmark for the web application presented in the web browser. The web browser can identify the currently selected plugin (e.g., based on an anchor in an address bar or information from the bootstrap object) and create a bookmark for the web application where the bookmark is specific to the currently selected plugin.

The web browser generates a request for a web application based on a selection of the bookmark (604). For example, the web browser determines that a user selected the bookmark and generates a web application request for the web application identified in the bookmark. The user selection of the bookmark can be during the same web browser session that the bookmark was created or during another web browser session.

The web browser requests the web application from the server (606) and receives the bootstrap object from the server (608). For example, the web browser provides the web application request to the server and receives the bootstrap object from the server in response to the web application request.

The bootstrap object initializes the requested web application (610). For example, the bootstrap object initializes the requested web application in the user interface of the web browser according to the default settings specified in the bootstrap object.

The bootstrap object requests the first plugin from the server based on the bookmark for the first plugin (612). For example, the bootstrap object determines that the web application was requested by a user with selection of the bookmark for the first plugin and identifies an anchor in the bookmark. The bootstrap object determines that the first plugin is associated with the anchor and requests the first plugin from the server.

The bootstrap object receives the first plugin (614) in response to the request for the first plugin and loads the first plugin in the user interface (616). For example, the bootstrap object customizes the requested web application by loading the first plugin in the user interface of the web browser.

4.0 Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term “data processing apparatus” encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by a computer, comprising:

for each of two or more applications from a plurality of applications available on a server:

requesting the application from the server;

receiving a bootstrap object from the server, wherein the bootstrap object is independent of each of the requested applications and includes one or more default settings for each of the requested applications, the default settings being default settings for each of the plurality of applications available on the server and including a default plugin handle, wherein the same bootstrap object is received by the computer in response to the requests for each of the two or more applications;

initializing the requested application in a corresponding user interface according to the default settings in the bootstrap object;

receiving, in response to requesting the application, a corresponding application configuration object from the server, wherein each of the application configuration objects is specific to the corresponding requested application and includes a plurality of corresponding plugin handles, each of the plurality of applications has a corresponding application configuration object different from each of the other application configuration objects in that each application configuration object incudes a different set of plugin handles;

loading, by the bootstrap object, the corresponding application configuration object;

receiving a default plugin from the server; and loading the default plugin in the corresponding user interface, wherein loading each of the default plugins exposes an application programming interface (API) of the default plugin to the bootstrap object.

2. The method of claim 1, comprising:

for each of the two or more applications:

identifying the default plugin using the default plugin handle; and requesting the default plugin from the server, wherein receiving the default plugin from the server comprises receiving the default plugin identified by the default plugin handle from the server in response to the request for the default plugin.

3. The method of claim 1, wherein receiving the default plugin from the server comprises receiving a corresponding copy of the default plugin identified by the corresponding default plugin handle from the server.

4. The method of claim 1, wherein receiving the default plugin identified by the default plugin handle from the server comprises receiving a copy of the same default plugin from the server.

5. The method of claim 1, wherein receiving the bootstrap object from the server comprises receiving the bootstrap object and the default plugin from the server.

6. The method of claim 1, wherein receiving the bootstrap object from the server comprises receiving, for each of the application requests, a corresponding copy of the same bootstrap object.

7. The method of claim 1, wherein loading the default plugin comprises:

providing, by the bootstrap object, the default plugin with a state of the corresponding requested application;

generating, by the default plugin, a corresponding widget using a current state of the requested application, wherein the corresponding widget is a control feature associated with the default plugin; and loading, by the bootstrap object, the corresponding widget in the corresponding user interface.

8. The method of claim 1, comprising:

for each of the two or more applications:

identifying an application specific plugin associated with the requested application using the corresponding plugin handles in the corresponding application configuration object;

requesting the corresponding application specific plugin from the server;

receiving the corresponding application specific plugin from the server in response to the request for the corresponding application specific plugin;

loading the corresponding application specific plugin in the corresponding user interface, wherein loading the corresponding application specific plugin exposes an API of the corresponding application specific plugin to the bootstrap object; and providing, by the bootstrap object navigation between the default plugin and the corresponding application specific plugin.

9. The method of claim 8, wherein providing navigation between the default plugin and the corresponding application specific plugin comprises passing a state of the requested application between the default plugin and the corresponding application specific plugin.

10. The method of claim 1, wherein:

an application request includes a universal resource identifier (URI) that includes an anchor, wherein the anchor is associated with an application specific plugin and the application specific plugin is specified by one of the plugin handles included in the corresponding application configuration object; and requesting the application from the server comprises providing the corresponding URI to the server, the method comprising:

receiving the application specific plugin based on the anchor from the application request.

11. The method of claim 1, comprising:

for each of the two or more applications:

creating a bookmark for an application specific plugin using on an anchor associated with the application specific plugin.

12. The method of claim 11, comprising:

for each of the two or more applications:

generating a request for the application based on a selection of the corresponding bookmark in the corresponding user interface;

requesting the application from the server using the request for the application;

receiving the bootstrap object from the server in response to requesting the application from the server;

initializing the requested application in the corresponding user interface according to the default settings;

requesting the corresponding application specific plugin from the server based on the bookmark for the corresponding application specific plugin;

receiving the corresponding application specific plugin from the server in response to the request for the corresponding application specific plugin; and loading the corresponding application specific plugin in the corresponding user interface.

13. The method of claim 1, wherein the bootstrap object includes one or more common procedure calls for use in each of the plurality of applications.

14. The method of claim 1, comprising:

for each of the two or more applications:

customizing the corresponding user interface of the requested application using on the corresponding application configuration object.

15. The method of claim 1, comprising, for at least one of the applications:

receiving two or more corresponding application configuration objects from the server, the two or more corresponding application configuration objects including the corresponding application configuration object;

identifying, by the bootstrap object, permissions associated with the computer that specify the application configuration objects available to the corresponding requested application running on the computer;

selecting, based on the permissions, the corresponding application configuration object from the two or more corresponding application configuration objects; and loading, based on the selecting, the corresponding application configuration object.

16. The method of claim 15, wherein:

identifying, by the bootstrap object, the permissions associated with the computer comprises determining whether the permissions comprise a general configuration, an advanced configuration, or a developer configuration; and selecting, based on the permissions, the corresponding application configuration object from the two or more corresponding application configuration objects comprises selecting, by the bootstrap object, a particular application configuration object as the corresponding application configuration object, wherein the particular application configuration object is a general configuration object, an advanced configuration object, or a developer configuration object that corresponds to general configuration permissions, advanced configuration permissions, or developer configuration permissions respectively.

17. The method of claim 1, wherein, for at least one of the applications:

requesting the application from the server comprises sending a request that includes data indicating an authority level associated with an instance of the application; and receiving the corresponding application configuration object from the server comprises receiving the corresponding application configuration object from the server, the corresponding application configuration object selected by the server based on the authority level associated with the instance of the corresponding application.

18. The method of claim 1, wherein each of the two or more applications comprises a web application.

19. A system, comprising:

a data processing apparatus; and a non-transitory computer readable storage medium in data communication with the data processing apparatus and storing instructions executable by the data processing apparatus and upon such execution cause the data processing apparatus to perform operations comprising:

for each of two or more applications from a plurality of applications available on a server:

requesting the application from the server;

receiving a bootstrap object from the server, wherein the bootstrap object is independent of each of the requested applications and includes one or more default settings for each of the requested applications, the default settings being default settings for each of the plurality of applications available on the server and including a default plugin handle, wherein the same bootstrap object is received by the data processing apparatus in response to the requests for each of the two or more applications;

initializing the requested application in a corresponding user interface according to the default settings in the bootstrap object;

receiving, in response to requesting the application, a corresponding application configuration object from the server, wherein each of the application configuration objects is specific to the corresponding requested application and includes a plurality of corresponding plugin handles, each of the plurality of applications has a corresponding application configuration object different from each of the other application configuration objects in that each application configuration object includes a different set of plugin handles;

loading, by the bootstrap object the corresponding application configuration object;

receiving a default plugin from the server; and loading the default plugin in the corresponding user interface, wherein loading each of the default plugins exposes an application programming interface (API) of the default plugin to the bootstrap object.

20. The system of claim 19, the operations comprising:

for each of the two or more applications:

identifying the default plugin using the default plugin handle; and requesting the default plugin from the server, wherein receiving the default plugin from the server comprises receiving the default plugin identified by the default plugin handle from the server in response to the request for the default plugin.

21. The system of claim 19, wherein loading the default plugin comprises:

providing, by the bootstrap object, the default plugin with a state of the corresponding requested application;

generating, by the default plugin, a corresponding widget using a current state of the requested application, wherein the corresponding widget is a control feature associated with the default plugin; and loading, by the bootstrap object, the corresponding widget in the corresponding user interface.

22. The system of claim 19, the operations comprising:

for each of the two or more applications:

identifying an application specific plugin associated with the requested application using the corresponding plugin handles in the corresponding application configuration object;

requesting the corresponding application specific plugin from the server;

receiving the corresponding application specific plugin from the server in response to the request for the corresponding application specific plugin;

loading the corresponding application specific plugin in the corresponding user interface, wherein loading the corresponding application specific plugin exposes an API of the corresponding application specific plugin to the bootstrap object; and providing, by the bootstrap object, navigation between the default plugin and the corresponding application specific plugin.

23. The system of claim 22, wherein providing navigation between the default plugin and the corresponding application specific plugin comprises passing a state of the requested application between the default plugin and the corresponding application specific plugin.

24. The system of claim 19, wherein:

an application request includes a universal resource identifier (URI) that includes an anchor, wherein the anchor is associated with an application specific plugin and the application specific plugin is specified by one of the plugin handles included in the corresponding application configuration object; and requesting the application from the server comprises providing the corresponding URI to the server, the method comprising:

receiving the application specific plugin based on the anchor from the application request.

25. The system of claim 19, the operations comprising:

for each of the two or more applications:

creating a bookmark for an application specific plugin using on an anchor associated with the application specific plugin.

26. The system of claim 25, the operations comprising:

for each of the two or more applications:

generating a request for the application based on a selection of the corresponding bookmark in the corresponding user interface;

requesting the application from the server using the request for the application;

receiving the bootstrap object from the server in response to requesting the application from the server;

initializing the requested application in the corresponding user interface according to the default settings;

requesting the corresponding application specific plugin from the server based on the bookmark for the corresponding application specific plugin;

receiving the corresponding application specific plugin from the server in response to the request for the corresponding application specific plugin; and loading the corresponding application specific plugin in the corresponding user interface.

27. A non-transitory computer readable storage medium storing instructions executable by a data processing apparatus and upon such execution cause the data processing apparatus to perform operations comprising:

for each of two or more applications from a plurality of applications available on a server:

requesting the application from the server;

receiving a bootstrap object from the server, wherein the bootstrap object is independent of each of the requested applications and includes one or more default settings for each of the requested applications, the default settings being default settings for each of the plurality of applications available on the server and including a default plugin handle, wherein the same bootstrap object is received by the data processing apparatus in response to the requests for each of the two or more applications;

initializing the requested application in a corresponding user interface according to the default settings in the bootstrap object;

receiving, in response to requesting the application, a corresponding application configuration object from the server, wherein each of the application configuration objects is specific to the corresponding requested application and includes a plurality of corresponding plugin handles, each of the plurality of applications has a corresponding application configuration object different from each of the other application configuration objects in that each application configuration object incudes a different set of plugin handles;

loading, by the bootstrap object, the corresponding application configuration object;

receiving a default plugin from the server; and loading the default plugin in the corresponding user interface, wherein loading each of the default plugins exposes an application programming interface (API) of the default plugin to the bootstrap object.

* * * * *